United States Patent
Harrow et al.

(10) Patent No.: US 7,046,792 B2
(45) Date of Patent: May 16, 2006

(54) TRANSMIT/RECEIVE ARBITRATOR

(75) Inventors: Scott E. Harrow, Scottsdale, AZ (US); Judy Mae Fong, Chandler, AZ (US); Harold Downey, Tempe, AZ (US)

(73) Assignee: Acoustic Technologies, Inc., Mesa, AZ (US)

( * ) Notice: Subject to any disclaimer, the term of this patent is extended or adjusted under 35 U.S.C. 154(b) by 503 days.

(21) Appl. No.: 09/803,551

(22) Filed: Mar. 9, 2001

(65) Prior Publication Data

US 2002/0126836 A1    Sep. 12, 2002

(51) Int. Cl.
*H04M 1/00*    (2006.01)
*H04M 9/00*    (2006.01)

(52) U.S. Cl. .......................... 379/388.06; 379/388.03; 379/388.05; 379/390.01

(58) Field of Classification Search ........... 379/406.01, 379/406.16, 388.01, 388.02, 388.06; 375/285, 375/318, 317, 374, 376; 370/271–276, 277–296; 324/76.11–76.83; 327/50–77
See application file for complete search history.

(56) References Cited

U.S. PATENT DOCUMENTS

| | | | | | |
|---|---|---|---|---|---|
| 4,501,003 | A | * | 2/1985 | Miller | |
| 4,796,287 | A | | 1/1989 | Reesor et al. ................ | 379/390 |
| 4,879,745 | A | * | 11/1989 | Arbel .................... | 379/388.06 |
| 5,307,198 | A | * | 4/1994 | Sullivan ..................... | 359/196 |
| 5,313,498 | A | * | 5/1994 | Sano | |
| 5,418,848 | A | | 5/1995 | Armbrüster .................. | 379/406 |
| 5,535,433 | A | * | 7/1996 | Kurokawa et al. ............ | 455/79 |
| 5,598,466 | A | | 1/1997 | Graumann ................... | 379/389 |
| 5,684,861 | A | * | 11/1997 | Lewis et al. | |
| 5,692,042 | A | | 11/1997 | Sacca .......................... | 379/387 |
| 5,764,753 | A | * | 6/1998 | McCaslin et al. ....... | 379/406.07 |
| 5,867,574 | A | | 2/1999 | Eryilmaz ..................... | 379/389 |
| 6,138,040 | A | | 10/2000 | Nicholls et al. ............ | 455/569 |
| 6,389,480 | B1 | * | 5/2002 | Kotzur et al. | |

OTHER PUBLICATIONS

Dorf, Richard C. (Editor-in-Chief), "The Engineering Handbook", 1996, CRC Press, Inc. p. 1505.*
*Encyclopedia of Electronic Circuits*, Graf, Rudolf F. ed. TAB Books Divison of McGraw-Hill, vol. 3, p. 125, © 1991.

* cited by examiner

*Primary Examiner*—Fan Tsang
*Assistant Examiner*—Ramnandan Singh
(74) *Attorney, Agent, or Firm*—Paul F. Wille

(57) ABSTRACT

The amplitudes of a signal on the microphone input of a telephone and a signal on the line input of the telephone are compared with each other and with two thresholds. The comparisons are sampled and the samples control an up-down counter. The count in the counter is compared with two thresholds and the results of the comparisons are used to control at least two accumulators. A first accumulator counts consecutive comparisons having the same result and a second accumulator counts up or down in accordance with the comparisons. The counts in the first and second accumulators are logically analyzed to determine whether to receive or transmit. A plurality of samples defines a window, at the end of which the up-down counter is reset. The accumulators store data from a plurality of windows.

7 Claims, 1 Drawing Sheet

TRANSMIT/RECEIVE ARBITRATOR

BACKGROUND OF THE INVENTION

This invention relates to a circuit for comparing the relative power of two signals and providing an indication of the greater of two signals and, in particular, to a circuit that provides a stable indication suitable for use in half-duplex communication, such as speaker phones, and other applications.

Anyone who has used current models of speaker phones is well aware of the cut off speech and the silent periods during a conversation caused by echo canceling circuitry within the speaker phone. Such phones operate in what is known as half-duplex mode, which means that only one person can speak at a time. While such silent periods assure that the sound from the speaker is not coupled directly into the microphone within a speaker phone, the quality of the call is poor.

Whether or not to receive (listen) or transmit (talk) is not easily resolved in the particular application of telephone communication. Voices may overlap, so-called "double talk," particularly if there are more than two parties to a call or more than one person at a speaker phone. Background noise may cause problems if the noise level is a significant percentage of the voice level. Pauses in a conversation do not necessarily mean that a person is finished speaking and that it is time for someone else to speak. A voice signal is a complex wave that is discontinuous because not all speech sounds use the vocal chords. Analyzing a voice signal in real time and deciding whether or not a person has finished speaking is a complex problem despite the ordinary human experience of doing it unconsciously or subconsciously. A variety of electronic systems have been proposed in the prior art for arbitrating send or receive but the problem remains.

U.S. Pat. No. 4,796,287 (Reesor et al.) discloses a speaker phone in which a decremented counter provides a delay to channel switching by the remainder of the circuit. The magnitudes of the line signal and the microphone signal are used in determining whether or not to switch channels.

U.S. Pat. No. 4,879,745 (Arbel) discloses a half-duplex speaker phone that controls the selection of either a transmit or a receive audio path based upon a present state of the speaker phone and the magnitudes of three variables associated with each path. The three variables for each path include signal power, noise power, and worst-case echo.

U.S. Pat. No. 5,418,848 (Armbrüster) discloses a double talk detector wherein an evaluation circuit monitors voice signals upstream and downstream of echo canceling apparatus for detecting double talk. An up-down counter is incremented and decremented at different rates and a predetermined count is required before further signal processing takes place.

U.S. Pat. No. 5,598,466 (Graumann) discloses a voice activity detector including an algorithm for distinguishing voice from background noise based upon an analysis of average peak value of a voice signal compared to the current sample of the audio signal.

U.S. Pat. No. 5,692,042 (Sacca) discloses a speaker phone including non-linear amplifiers to compress transmitted and received signals, and level detectors to determine the levels of the compressed transmitted and received signals. The compressed signals are compared in a comparator having hysteresis to enable either transmit mode or receive mode.

U.S. Pat. No. 5,764,753 (McCaslin et al.) discloses a double talk detector that compares the send and receive signals to determine "Return Echo Loss Enhancement," which is stored as a digital value in a register. The digital value is adjusted over time and is used to provide a variable, rather than fixed, parameter to which new data is compared in determining whether to send or receive.

U.S. Pat. No. 5,867,574 (Eryilmaz) discloses a voice activity detection system that uses a voice energy term defined as the sum of the differences between consecutive values of a speech signal. Comparison of the voice energy term with threshold values and comparing the voice energy terms of the transmit and receive channels determines which channel will be active.

U.S. Pat. No. 6,138,040 (Nicholls et al.) discloses comparing the energy in each "frame" (thirty millisecond interval) of speech with background energy to determine whether or not speech is present in a channel. A timer is disclosed for bridging gaps between voiced portions of speech.

Typically, these systems are implemented in digital form and manipulate large amounts of data in analyzing the input signals. The Sacca patent discloses an analog system using an amplifier with hysteresis to avoid dithering, which, to a large extent, is unavoidable with a simple amplitude comparison. On the other hand, an extensive computational analysis to determine relative power takes too long. The Eryilmaz patent attempts to simplify the amount of computation but still requires manipulation of significant amounts of data. In all these systems manipulate amplitude data, or data derived from amplitude, up to the point of making a binary value signal indicating receive or transmit.

Some of the prior art systems use historical data, e.g. three occurrences of what is interpreted as a voice signal. Such systems require large amounts of memory to handle the historical data and the current data.

Although implementation details are generally not discussed in the foregoing patents, the prior art typically uses capacitors for sampling a signal, for coupling a signal between stages, or for other purposes. A problem with capacitors is that the capacitance changes with age. Another problem is that capacitors are hard to match, requiring calibration of the system. Finally, capacitors are expensive and, except for very small values of capacitance, cannot be implemented in integrated circuit form.

In view of the foregoing, it is therefore an object of the invention to provide an improved circuit for providing an indication of the greater of two signals and, in particular, to a circuit that provides a stable indication suitable for use in half-duplex communication.

Another object of the invention is to provide a circuit for arbitrating between competing signals without extensive or high level computations.

A further object of the invention is to provide a circuit for comparing signal levels digitally without the use of capacitors.

Another object of the invention is to provide a transmit/receive arbitrator that can be fully incorporated into an integrated circuit.

A further object of the invention is to provide an arbitration circuit that condenses sample data for arbitration.

Another object of the invention is to provide an arbitration circuit that includes condensed historical data in the arbitration.

SUMMARY OF THE INVENTION

The foregoing objects are achieved in this invention in which the amplitudes of a signal on the microphone input of a telephone and a signal on the line input of the telephone are compared with each other and with two thresholds. The comparisons are sampled and the samples control an up-down counter. The count in the counter is compared with two thresholds and the results of the comparisons are used to control at least two accumulators. A first accumulator counts consecutive comparisons having the same result and a second accumulator counts up or down in accordance with the comparisons. The counts in the first and second accumulators are logically analyzed to determine whether to receive or transmit. A plurality of samples defines a window, at the end of which the up-down counter is reset. The accumulators distill data from a plurality of windows.

BRIEF DESCRIPTION OF THE DRAWINGS

A more complete understanding of the invention can be obtained by considering the following detailed description in conjunction with the accompanying drawings, in which:

FIG. 4 is a schematic of a circuit for distilling the data in a plurality of windows; and FIG. 5 is a schematic of the logic circuitry for determining receive or transmit.

DETAILED DESCRIPTION OF THE INVENTION

Figure 1:
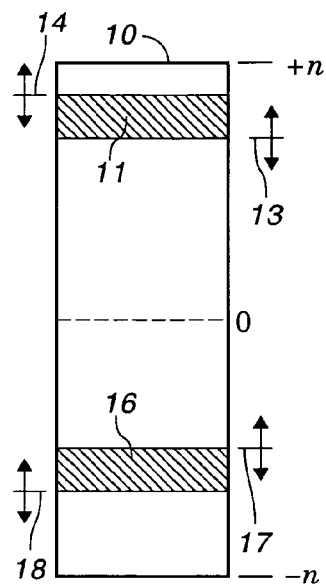
FIG. 1 is a diagram representing the operation of an arbitration circuit constructed in accordance with the invention.

In FIG. 1 register 10 has a capacity of ±n and starts at a count of zero in the middle of the register. Register 10 counts either up or down away from zero in accordance with the data coupled to the register. If data is consistently positive then the count increases toward region 11, which lies between threshold 13 and threshold 14, both of which are adjustable. Similarly, if data is consistently negative then the count increases in a negative direction toward region 16, which lies between threshold 17 and threshold 18, both of which are adjustable. The starting point is arbitrary. One could as easily say that register 10 had a capacity of m and started counting at m/2.

If new data causes the count to exceed (i.e. be numerically greater than) threshold 14 or threshold 18, additional data of the same sign is ignored. This is known as preventing roll-over or roll-under and is known per se in the art.

In accordance with the invention, register 10 is incremented or decremented depending upon a three bit word representing the states of the signals on the microphone input and the line input to a telephone (not shown in FIG. 1). The direction of the count is determined by whether or not the signal on the microphone input is larger than the signal on the line input. Thus, entering region 11 implies a relatively consistent signal on the microphone input and entering region 16 implies a relatively consistent signal on the line input. The size of a region defines how much variation is tolerated before one exits the region. The regions need not by symmetrical about zero. Thus, moving threshold 13 further away from zero than threshold 17 biases the system to favor the line input. Similarly, making region 11 smaller than region 16 biases the system to favor the line input. Register 10 accumulates data for a period of time defined as a window. Data in a window and in successive windows contribute to the decision on whether to receive or transmit.

Figure 2:
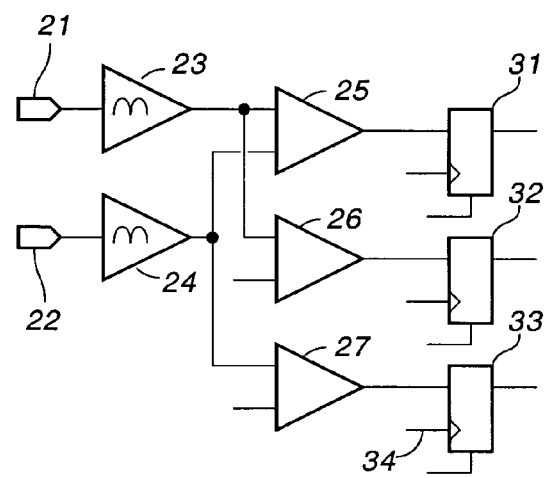
FIG. 2 is a schematic diagram of a circuit for converting analog signals into three bits of sample data.

FIG. 2 is a schematic of a circuit for processing individual samples of input signal. Input 21 is coupled to the microphone input to a speakerphone (not shown). Input 22 is the line input from the telephone network. Amplifiers 23 and 24 full wave rectify the signal on the line.

Comparator 25 is coupled to the outputs of amplifiers 23 and 24 and provides an indication of which signal is the larger. Comparator 26 compares the rectified line input signal to a threshold value and provides a signal indicating which is larger. Comparator 27 compares the rectified microphone input signal to another threshold value and provides a signal indicating which is larger. The outputs of comparators 25, 26, and 27 are coupled to D-flip-flops 31, 32, and 33, which latch the data on each clock pulse, e.g. on line 34 to D-flip-flop 33. In one embodiment of the invention, the input signals are sampled at 44.1 kHz. Other sampling rates could be used instead.

Note that a sample of the signal is not stored on a capacitor. The amplitudes of the input signals are not actually measured, except for exceeding a threshold. The states of comparators 25, 26, and 27 are what is being sampled to produce three bits of data.

Figure 3:
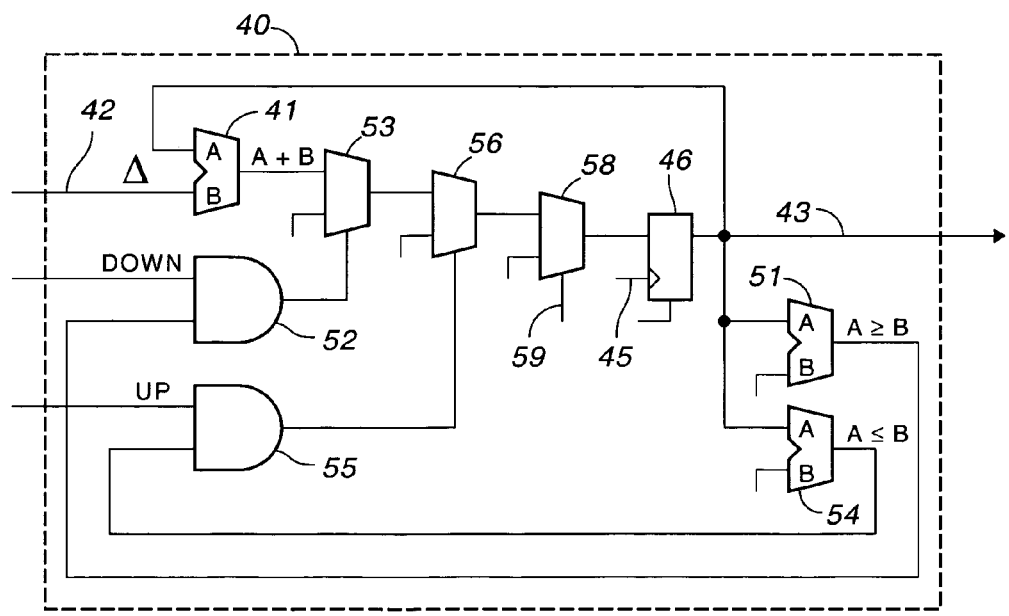
FIG. 3 is a schematic of a circuit for distilling data from a series of samples in a window.

FIG. 3 is a schematic of an accumulator used, with slight variations, at several places in FIG. 4. Accumulator 40 includes adder 41 having two data inputs and an output giving the sum of the inputs. In its simplest form, adder 41 adds an offset to its previous output to produce a new output. Input 42 provides the offset, which can be positive or negative, and accumulator output 43 is coupled to the second input of adder 41. The add operation is synchronized with the remainder of the system by clock pulses on clock input 45 of D-flip-flop 46, which latches the data on output 43.

Comparator 51, AND gate 52, and multiplexer 53 prevent roll-over. Comparator 54, AND gate 55, and multiplexer 56 prevent roll-under. The comparators check the output of D-flip-flop 46 against data defining thresholds 14 and 18. Multiplexer 58 provides a data reset under the control of a signal on input 59. The data reset occurs after a predetermined number of samples, e.g. 127, to define a window.

If the output of AND gate 52 is true, then multiplexer 53 switches inputs and applies data representing threshold 14 (FIG. 1) to output 43, assuming that multiplexers 56 and 58 are unchanged. This prevents roll-over. Similarly, if the output of AND gate 55 is true, then multiplexer 56 switches inputs and applies data representing threshold 18 (FIG. 1) to output 43, assuming that multiplexer 58 is unchanged. A data reset causes multiplexer 58 to change inputs and apply reset data, e.g. zero, to output 43.

Note that there is a hierarchy. Multiplexer 58 overrides all others, multiplexer 56 overrides multiplexer 53, and so on. This construction of accumulator 40 differs from other roll-over/roll-under protection schemes in at least two ways. Referring to FIG. 1, thresholds 14 and 18 are not at the limits of the counter. Fixed data is forced on the output, which protects the system regardless (within reason) of the size of delta ($\Delta$), the counting increment. That is, from within region 11 or region 16, a single delta ($\Delta$) is insufficient to cause roll-over or roll-under.

The output from accumulator 40 is a number, represented by eight bits in one embodiment of the invention. Fewer bits or more bits could be used. The number can be anywhere between thresholds 14 and 18. This number, in turn, is converted into an incremental change in another accumulator. Thus, successive samples are reduced to a single number (one window) and successive windows are converted (and reduced) to four counts. These counts are analyzed to determine whether to receive or send.

FIG. 4 is a schematic of a signal analyzer constructed in accordance with a preferred embodiment of the invention. Input 61 is coupled to the output of D-flip-flop 31 (FIG. 2), input 62 is coupled to the output of D-flip-flop 32 (FIG. 2), and input 63 is coupled to the output of D-flip-flop 33 (FIG. 2). Inputs 61 and 62 are coupled to AND gate 65, which produces a logic "1" when the received signal (line input) is greater than the microphone signal and is greater than a predetermined threshold. The output of AND gate 65 is coupled to the "down" input of accumulator 40. Inverted input 62 and input 63 are coupled to AND gate 66, which produces a logic "1" when the received signal (line input) is less than a predetermined threshold and the microphone signal is greater than a predetermined threshold. The thresholds need not be the same value. The output of AND gate 66 is coupled to the "up" input of accumulator 40.

The outputs of AND gates 65 and 66 also form a two bit data bus that controls multiplexer 68, selecting one of three inputs for coupling to the data input of accumulator 40. In one embodiment of the invention, the three inputs were +1, 0, and −1. Other values can be used to suit circumstances, e.g. counting up by twos, counting down by threes, and not counting by zero if the inputs do not exceed their respective thresholds. After a predetermined number of counts, accumulator 40 is reset to an initial value, preferably its midpoint, represented by zero in FIG. 1.

The data from accumulator 40 is applied to comparators 71 and 72, which compare the data with thresholds and produce a logic true output if the threshold is exceeded. Thus, the information in accumulator 40 is distilled or condensed into two bits for the remainder of the circuit, which analyzes how these bits change over time to provide an indication of attack and decay in the input signals.

The window defined by accumulator 40 is preferably from $2^6$ (127) to $2^{10}$ (2,047) counts of the clock signal. At a clock signal of 44.1 kHz., this corresponds to a period of 2.9 to 46.4 milliseconds. The remaining accumulators in FIG. 4 analyze a plurality of windows. Accumulators 73 and 74 look for a programmable number of "attacks" in a row; e.g. four consecutive logic trues from comparator 71 or comparator 72. The delta or count input to these accumulators is a single value, 1. If accumulator 73 counts to four on four consecutive windows, the output of comparator 76 goes true. Similarly, if accumulator 74 counts to four on four consecutive windows, the output of comparator 77 goes true. The outputs stay true for as long as consecutive attacks are detected. Accumulators 73 and 74 set the resolution of the system by the number of consecutive hits required to produce a logic true output. The greater the number of hits, the coarser the resolution.

Accumulators 81 and 82 analyze the data from accumulator 40 differently from accumulators 73 and 74 in that the delta is either +m or −n, depending upon the outputs from multiplexers 83 and 84. Thus, a signal that is generally, but not consistently, present will increment the accumulator more often than the signal decrements the accumulator, slowly increasing the count. Similarly, a signal that is generally, but not consistently, absent will decrement the accumulator more often than the signal increments the accumulator, slowly decreasing the count. Digital comparators are provided to prevent roll-over and roll-under. Accumulator 81 (and accumulator 73) monitor line input and accumulator 82 (and accumulator 74) monitor microphone input.

Comparator 91 is part of the under-flow prevention circuitry, in addition to providing the output from accumulator 81. Comparator 92 is part of the over-flow prevention circuitry. Comparators 93 and 94 provide a two way comparison of the outputs of accumulators 81 and 82. Comparator 96 is part of the under-flow prevention circuitry, in addition to providing the output from accumulator 82. Comparator 95 is part of the over-flow prevention circuitry.

Several outputs in FIG. 4 are marked with numbered circles, corresponding to the numbered circles adjacent the inputs in FIG. 5. The data in accumulators 73 and 74 represent whether or not the signal was relatively uniform for the last four windows. (The number of windows is programmable). The data in accumulators 81 and 82 represent attack or decay data from several windows. In effect, accumulators 81 and 82 distill a large amount of historical data into one byte of data, which is then further distilled by being compared with thresholds to produce binary (single bit) data. The bits are then combined by the circuit in FIG. 5 to make a decision on whether to transmit or receive.

In FIG. 5, the inputs to OR gate 101 are coupled comparators 91 and 94 (FIG. 4) and the output is coupled to AND gate 102. The other input to NAND gate 102 is coupled to comparator 74 (FIG. 4). The inputs to OR gate 103 are coupled comparators 76 and 93 (FIG. 4) and the output is coupled to NAND gate 104. The other input to NAND gate 104 is coupled to comparator 96 (FIG. 4). The output of NAND gate 102 is coupled to one input of NAND gate 105 and the other input to NAND gate 105 is coupled to the output of D-flip-flop 106. The outputs of NAND gate 105 and NAND gate 104 are coupled to the inputs of NAND gate 107. The output of NAND gate 107 is coupled to the data input of D-flip-flop 106.

Several combinations of signals will produce a logic true or "1" output, indicating a receive enable. If the output from D-flip-flop 106 is "0", then NAND gate 105 produces a logic "1" output, enabling NAND gate 107, and the data on inputs (1), (4), and (5) does not matter. When enabled, NAND gate 107 acts like an inverter and gates 104 and 107 together act like an AND gate. Thus, a logic "1" is produced at the output if both inputs to gate 104 are high. That is, a logic "1" output is produced if the output of either comparator 76 or comparator 93 (FIG. 4) is high and if the output from comparator 96 (FIG. 4) is high.

If the output of NAND gate 107 is high and latched by D-flip-flop 106, then NAND gate 105 inverts the output of NAND gate 102 and the two act as an AND gate. The output of NAND gate 107 will go low only if both inputs are high, which means that both inputs to gate 102 must be high and one input to gate 104 must be low.

Unlike the prior art, the invention does not measure power and compare measurements to decide which signal is stronger. Rather, the invention creates a kind of weighted histogram of the signals and compares the histograms. The histograms are weighted in that newer data affects outcome more than older data.

The invention thus provides an improved circuit for providing an indication of the greater of two signals and, in particular, to a circuit that provides a stable indication suitable for use in half-duplex communication. The circuit does not use extensive or high level computations and, because capacitors are not used, the circuit can be fully incorporated into an integrated circuit. In operation, the circuit condenses sample data for arbitration and uses historical data in the arbitration.

A circuit constructed in accordance with the invention can analyze a signal having a "power tail" of up to 1,500 milliseconds, a feat impossible with the prior art because of the enormous amount of data that would have to be available to make a decision. A circuit constructed in accordance with the invention is very fast, particularly when one recalls that data processing is taking place on a 44.1 kHz. clock, in one embodiment of the invention, which is orders of magnitude slower than the clocks needed in the prior art for complex power calculations. The invention provides programmable hysteresis depending upon the power tail of the previous signal. On can change the duration of the power tail with a modest increase in the size of the accumulators. For example, adding two bits to the accumulators changes the maximum power tail from 1.5 seconds to six seconds. One can also increase the power tail by reducing the sampling rate at the front end. For example, taking every fourth sample will similarly increase the duration of the power tail by a factor of four.

Having thus described the invention, it will be apparent to those of skill in the art that various modifications can be made within the scope of the invention. For example, the count in accumulator 40 can be set at some value between threshold 14 and +n or between threshold 18 and −n to prevent roll-over or roll-under, although this will decrease the maximum delta ($\Delta$) that can be used. The particular logic shown is preferred but not the only logic that can be used to implement the invention. This is meant in all senses of the word "logic," including the arrangement of the various gates and the levels chosen, e.g. true=1=high. The sizes of the windows can be different from the ones disclosed. In one embodiment of the invention, the registers used for data storage and for setting the sizes of windows were all programmable. This provided at least two advantages. One is that the circuit can be modified to suit particular needs, office vs. car for example. If the acoustics of a particular enclosure introduce unwanted bias of either power signal, the invention can compensate for the bias. Another advantage is that the circuit is easily tested, e.g. by forcing certain data into the system, unlike devices of the prior art.

What is claimed as the invention is:

1. In a speakerphone having a line input and a microphone input, a method for comparing a first signal on the microphone input with a second signal on the line input to determine whether to transmit or receive, said method comprising the steps of:
   (a) comparing the signals to each other and to at least one threshold to produce a binary representation of the comparisons;
   (b) converting a plurality of binary representations into a first count; and
   (c) comparing the first count to at least one count threshold to indicate whether to transmit or receive.

2. The method as set forth in claim 1 wherein comparing step (a) includes the steps of:
   comparing the signals in an analog comparator;
   sampling the output of the comparator to produce said binary representation of the comparison.

3. The method as set forth in claim 1 wherein comparing step (c) includes the step of (d) providing a binary indication of the results of comparing the first count to at least one count threshold.

4. The method as set forth in claim 3 and further including the step of:
   (e) controlling a first accumulator and a second accumulator with said binary indication;
   wherein the first accumulator counts consecutive binary indications of the same value; and
   the second accumulator increments or decrements in accordance with the binary indication.

5. The method as set forth in claim 4 and further including the step of:
   (f) logically comparing the counts in the accumulators to produce a binary signal.

6. The method as set forth in claim 5 wherein step (f) includes the steps of:
   comparing the count in the first accumulator to a threshold and producing a first single bit representation of the comparison;
   comparing the count in the second accumulator to a threshold and producing a second single bit representation of the comparison;
   logically combining the first bit representation with the second bit representation.

7. The method as set forth in claim 1 wherein said comparing step includes comparing the first signal to a first threshold and comparing the second signal to a second threshold.

* * * * *